United States Patent [19]

Postel

[11] Patent Number: 4,817,777

[45] Date of Patent: Apr. 4, 1989

[54] ARTICLE INVERTING DEVICE

[75] Inventor: Kevin S. Postel, Harrisburg, Pa.

[73] Assignee: AMP Incorporated, Harrisburg, Pa.

[21] Appl. No.: 89,380

[22] Filed: Aug. 26, 1987

[51] Int. Cl.$^4$ ............................................. B65G 47/24
[52] U.S. Cl. ..................................... 193/46; 198/417;
221/267; 221/291
[58] Field of Search ..................... 193/44, 45, 46, 48;
198/402, 400, 389, 417, 390; 221/267, 173, 291;
414/780, 782

[56] References Cited

U.S. PATENT DOCUMENTS

| | | | |
|---|---|---|---|
| 2,207,590 | 7/1940 | Lagaard | 198/417 X |
| 2,379,713 | 7/1945 | Hohl | 198/417 |
| 2,432,561 | 12/1947 | De Mott | 221/267 |
| 2,939,505 | 6/1960 | Bucher et al. | 221/171 X |
| 3,253,735 | 5/1966 | Brown et al. | 193/44 X |
| 3,261,442 | 7/1966 | Beck | 193/48 X |
| 3,565,285 | 2/1971 | Asnes | 221/267 |
| 4,113,143 | 9/1978 | Spagnola, Jr. | 221/267 |
| 4,458,801 | 7/1984 | Nichols | 193/46 |
| 4,465,176 | 8/1984 | Long, Jr. | 198/400 |
| 4,492,299 | 1/1985 | McLeod | 198/417 |

FOREIGN PATENT DOCUMENTS

| | | | |
|---|---|---|---|
| I6625Ib | 8/1956 | Fed. Rep. of Germany | 193/46 |
| 211214 | 9/1986 | Japan | 193/46 |

Primary Examiner—Frank E. Werner
Assistant Examiner—Cheryl L. Gastineau
Attorney, Agent, or Firm—Allan B. Osborne

[57] ABSTRACT

A device for inverting articles being transferred from one location to another in an assembly machine. More particularly, the device includes a tube having a helical groove extending therealong so that an article entering one end of the groove is inverted at the other end.

6 Claims, 5 Drawing Sheets

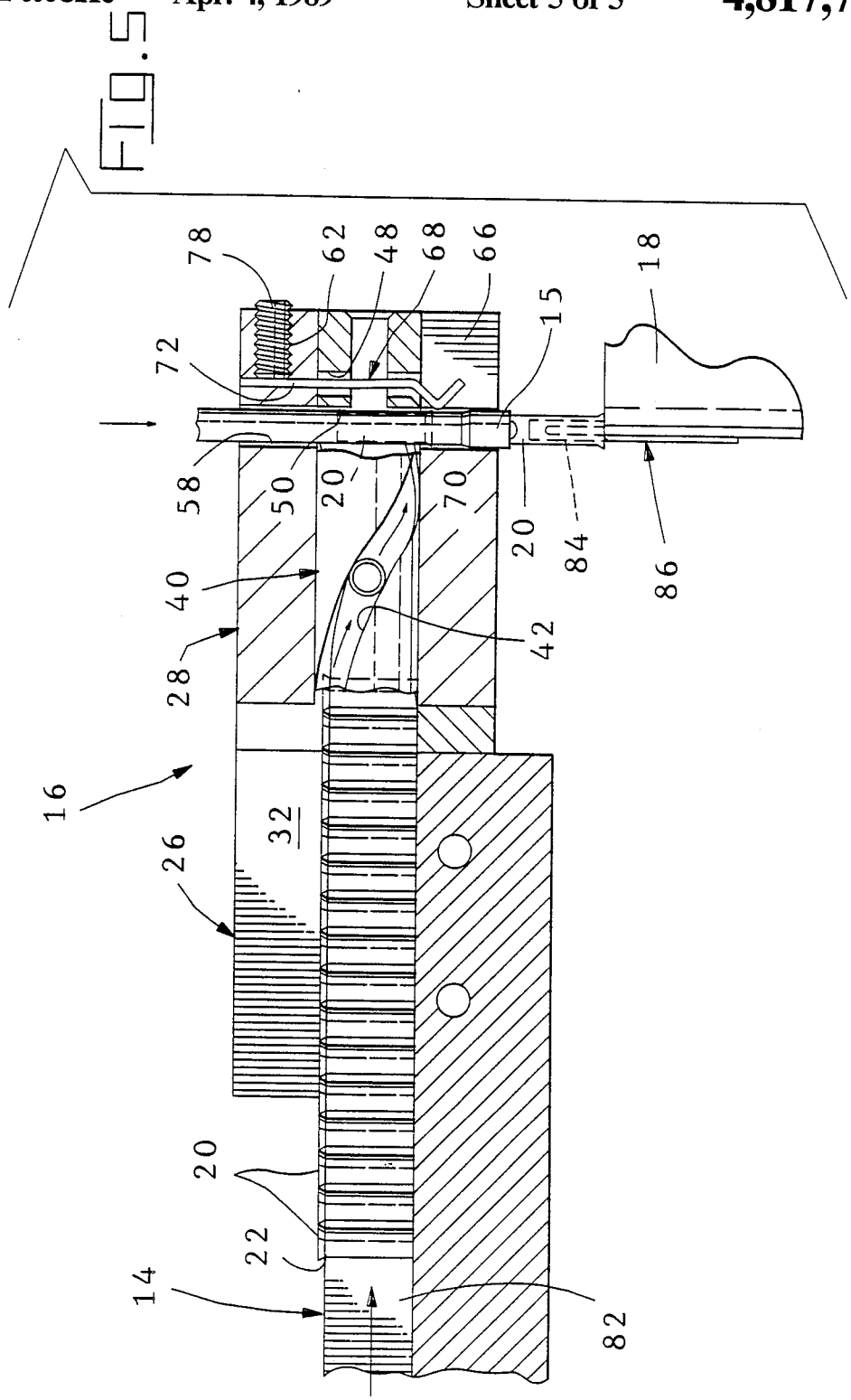

ARTICLE INVERTING DEVICE

FIELD OF THE INVENTION

The invention disclosed herein relates to a device which receives and inverts articles being transferred from one location to another.

BACKGROUND OF THE INVENTION

A known prior art device for changing the positioning or orientation of an article during its transfer from one location to another in a assembly or processing machine includes a quarter round plate having an article-receiving groove extending along the periphery thereof. For articles having a flared end for example, the length and height of the plate must be tailored to the angle the articles are to each other. Accordingly, even though the articles may be small, the plate would take up substantial space in the machine. Further, the articles can only be partly inverted; i.e., they experience a half revolution rather than being completely inverted.

It is therefore, desirable to provide a device which will take up less space in a machine and will completely invert the articles during the transfer form one location to another.

SUMMARY OF THE INVENTION

According to the present invention, an article inverting device is provided for use in a machine wherein the articles require inverting in preparation for use thereof. The device includes an elongated tube having a helical groove extending therealong and which encircles the tube by about 180 degrees so that an article entering the groove at one end will be inverted at the other end. The device further includes a spring which releasably retains the inverted article at the the other end.

BRIEF DESCRIPTION OF THE DRAWINGS

FIGS. 4 and 5 are sectioned side views illustrating the functioning of the article inverting device.

DESCRIPTION OF THE INVENTION

Figure 1:
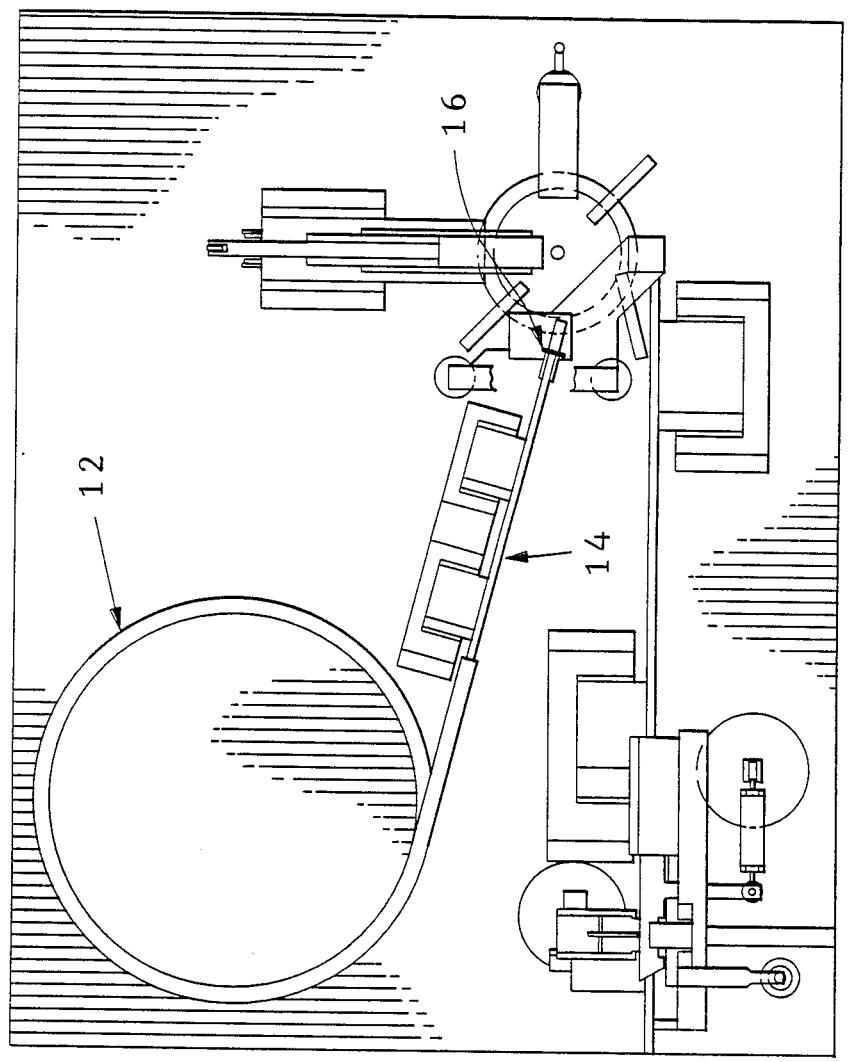
FIGS. 1 and 2 are generalized, top plan and side views respectively of a typical machine utilizing an article inverting device of the present invention.
Figure 2:
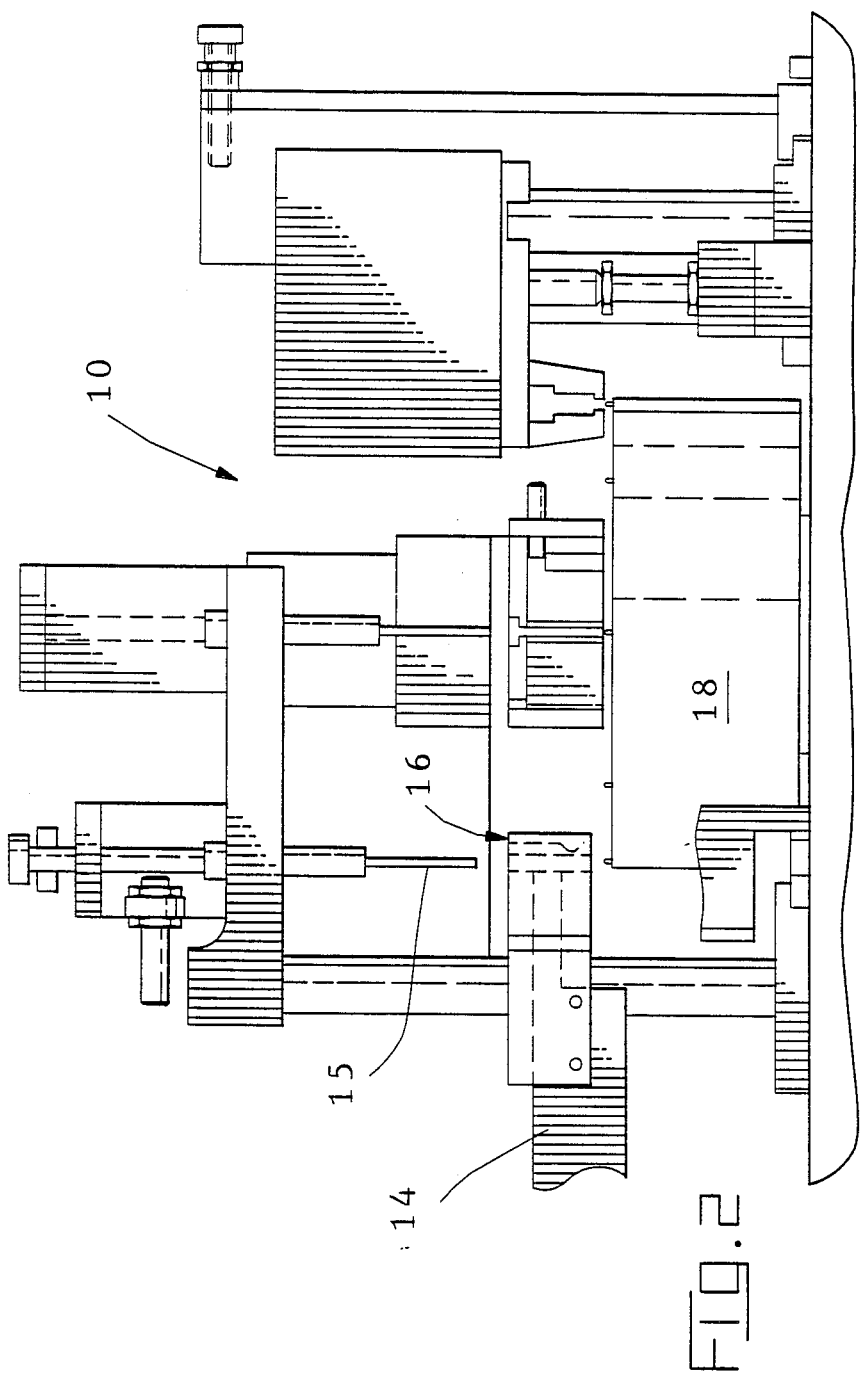

As shown in FIGS. 1 and 2, machine 10 includes vibrating reservoir 12, article feed track 14, reciprocating ram 15, article inverting device 16 of the present invention and a rotating work station 18. As is well known in the art, articles such as insulating sleeve 20, are transferred from reservoir 12 to work station 18 for product assembly. Insulating sleeve 20 (FIGS. 3–5) illustrates the functioning of the present invention. As sleeve 20 moves from reservoir 12, flared end 2 thereon (FIGS. 3–5) is facing upwardly to facilitate its movement out of vibrating reservoir 12 and along feed track 14. Because it will be mounted onto wire barrel 24 on terminal 26 (FIGS. 4,5) located on work station 18 with flared end 22 facing downwardly, sleeve 20 must be inverted. Device 16 does this as will be described below.

Figure 3:
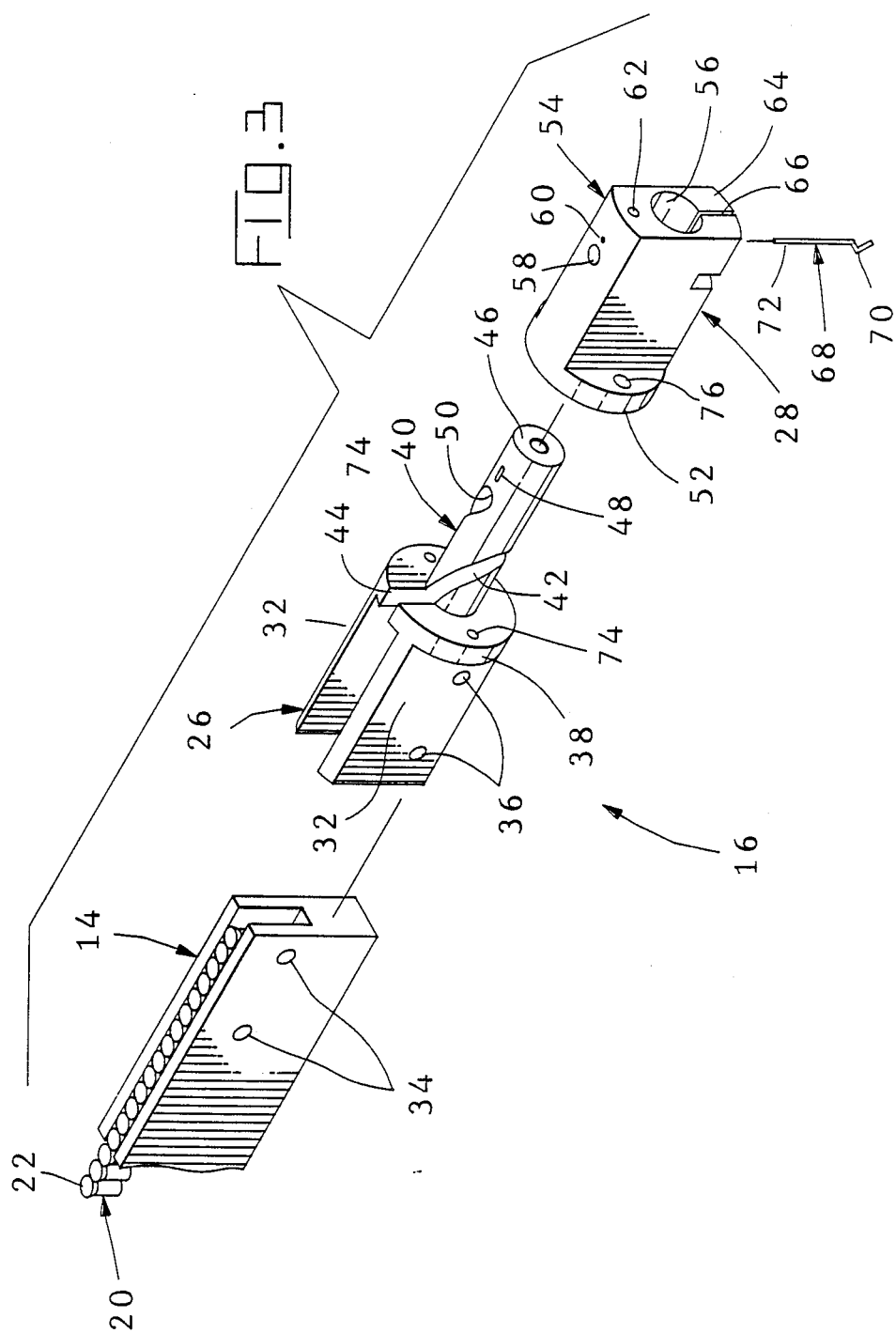
FIG. 3 is an exploded, perspective view of the article inverting device.

As shown in FIG. 3, article inverting device 16 includes first and second members 26,28 respectively.

First member 26 includes at one end a structure for attaching it to feed track 14 or directly to reservoir 12. The stucture shown includes parallel side walls 32 which slide on each side of track 14 and is secured thereto by fastening means such as roll pins (not shown) being positioned in holes 34 in track 14 and holes 36 in walls 32. Other attachment means could be used.

Walls 32 are attached to and extend away from one side of annular flange 38. Tube 40 is attached to and extends away from an opposite side of flange 38 as shown.

Helical groove 42 provided in tube 40 extends from notch 44 in flange 38 outwardly towards tube free end 46, making one-half revolution. Further, groove 42 cuts through tube 40 from one side to the other. Slot 48, located adjacent terminal end 50 of groove 42, extends through tube 40 perpendicular to its axis.

Figure 4:
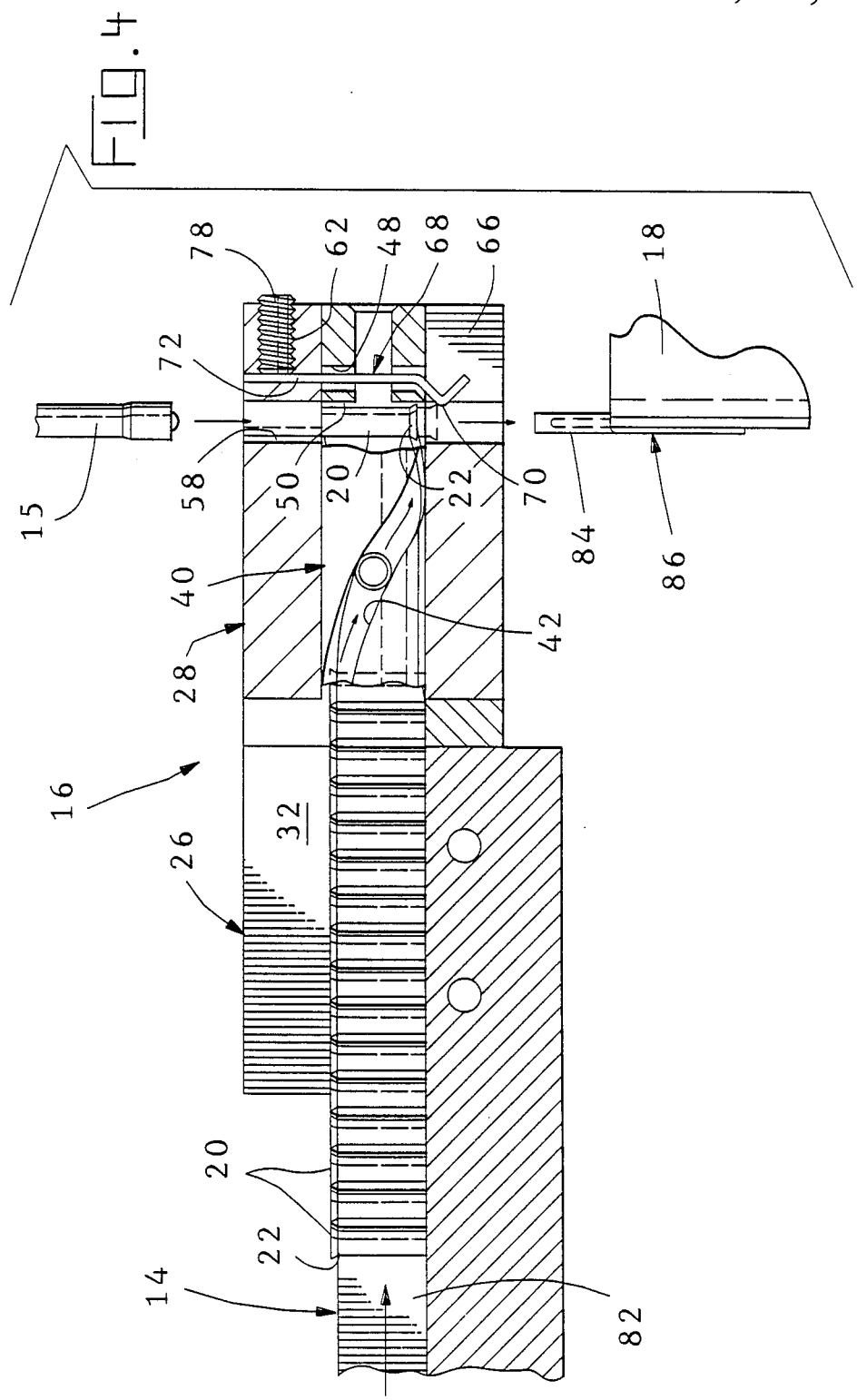

Second member 28 includes annular flange 52 and sleeve 54 attached to and extending from one side of flange 52. Passage 56 extends longitudinally through member 28 to receive tube 40 on first member 26. Sleeve 54 is provided with hole 58 which extends normally therethrough and a smaller normally extending hole 60 located adjacent to hole 58. However, hole 60, as shown in FIG. 4, extends only to passage 56. Additionally, sleeve 54 is provided with a threaded hole 62 extending longitudinally thereinto from end face 64 to hole 60 and slit 66 extending longitudinally into sleeve 54 from face 64, intersecting hole 58.

Second member 28 also includes spring 68 which has nose 70 at one end of elongated stem 72.

Article inverting device 16 is assembled by sliding tube 40 on first member 26 into passage 56 in second member 28 to where flanges 38,52 abut. Members 26,28 are then secured together by fastening means such as bolts (not shown) being received in holes 74,76 in flanges 38,52 respectively. As shown in FIG. 4, terminal end 50 of helical groove 42, will be in line with hole 58 so that ram 15 can pass therethrough. Spring 68 is positioned by placing stem 72 in hole 60 and securing it by set screw 78 being received in threaded hole 62. Nose 70 protrudes into hole 58 on one side of tube 40.

Device 16 is then mounted into machine 10 by being secured to track 14 as shown in FIGS. 4 and 5 and as noted above. As shown, the top edge surface 80 of track 14 is coplanar with tube 40 and groove 82 of track 14 is in line with notch 44 and helical groove 42. Further, ram 15 is in line with hole 58 in device 16. The positioning also places device 16 over work station 18.

In operation sleeves 20 enter track groove 82 with flared ends 22 riding on the edge surfaces defining that groove. From there, sleeves 20 enter helical groove 42, and are inverted so that upon reaching terminal end 50, flared ends 22 are facing in the opposite direction. As indicated in the drawings, helical groove 42 is as wide as required to receive sleeves 20 including flared ends 22 thereon. Sleeve 20 is kept from dropping through hole 58 by engaging nose 70 on spring 68. As each sleeve 20 reaches end 50, ram 15 moves down through hole 58, pushing the sleeve out of device 16 and onto wire barrel 24 of electrical terminal 26 mounted on work station 18 as shown in FIG. 5.

The force exerted by ram 15 is sufficient to cam nose 70 on spring 68 out of hole 58 to permit the passage of sleeve 20. As ram 15 moves back out of terminal end 50, the next sleeve 20 moves thereinto for being mounted on the next terminal 26 which will be brought into line by rotating station 18.

As can be discerned, an article inverting device for inverting articles during transfer from one location to another has been disclosed. The device includes an elongated tube having a helical groove along the length thereof through which the articles move, being inverted thereby in the process. A releasable spring retains the inverted article at the end of the helical groove pending discharge therefrom.

I claim:

1. An article inverting device for use in inverting articles from one orientation to another during transfer from a reservoir to a work station, said device comprising connecting means at one end for being attached to the reservoir or a track from the reservoir and an elongated tube at another end, said tube having a helical groove extending along a length thereof and encircling said tube by about 180 degrees so that an article entering said groove at one end and moving therethrough will be inverted at another end.

2. The device of claim 1 furhter including sleeve means having passage means for receiving said tube.

3. The device of claim 2 further including retaining means for releasably retaining an article at said another end.

4. The device of claim 3 further including an annular flange between and attached to said connecting means and said tube with said connecting means being on one side and said tube being on another side.

5. The device of claim 4 wherein said connecting means include a pair of spaced apart, parallel side walls.

6. The device of claim 5 wherein said flange includes a slot therethrough for providing access to said helical groove from said connecting means.

* * * * *